(12) United States Patent
Bonner

(10) Patent No.: US 9,037,120 B2
(45) Date of Patent: *May 19, 2015

(54) DISPLAY CALLER ID ON IPTV SCREEN

(71) Applicant: AT&T Mobility II LLC, Atlanta, GA (US)

(72) Inventor: Thomas W. Bonner, Cumming, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/791,320

(22) Filed: Mar. 8, 2013

(65) Prior Publication Data

US 2013/0189965 A1 Jul. 25, 2013

Related U.S. Application Data

(63) Continuation of application No. 13/251,776, filed on Oct. 3, 2011, now Pat. No. 8,396,475, which is a continuation of application No. 12/390,519, filed on Feb. 23, 2009, now Pat. No. 8,064,906, which is a continuation of application No. 11/256,130, filed on Oct. 21, 2005, now Pat. No. 7,499,704.

(51) Int. Cl.
| | |
|---|---|
| *H04W 4/10* | (2009.01) |
| *H04W 4/12* | (2009.01) |
| *H04L 29/06* | (2006.01) |

(52) U.S. Cl.
CPC .............. *H04W 4/12* (2013.01); *H04L 65/1016* (2013.01); *H04L 65/1096* (2013.01)

(58) Field of Classification Search
USPC ........ 455/414.1, 412.1, 412.2, 415, 416, 420, 455/466, 414.4, 566, 435.1, 435.2; 379/142.06, 142.07, 142.15
See application file for complete search history.

(56) References Cited

U.S. PATENT DOCUMENTS

| | | | |
|---|---|---|---|
| 7,139,797 B1 | 11/2006 | Yoakum et al. | |
| 7,149,506 B2 | 12/2006 | Osterhout et al. | |
| 7,167,468 B2 | 1/2007 | Donovan | |
| 7,212,810 B2 | 5/2007 | Babbar et al. | |
| 7,293,271 B2 | 11/2007 | Trossen et al. | |
| 7,502,615 B2 | 3/2009 | Wilhoite et al. | |
| 7,536,447 B1 * | 5/2009 | O'Neil ........................ | 709/217 |
| 7,555,108 B2 | 6/2009 | Sylvain | |
| 7,573,498 B1 | 8/2009 | Dhanoa et al. | |
| 7,636,578 B1 * | 12/2009 | Cope et al. .................... | 455/466 |

(Continued)

OTHER PUBLICATIONS

OA mailed Mar. 21, 2008 for U.S. Appl. No. 11/256,130, 10 pages.

(Continued)

*Primary Examiner* — Cong Tran
(74) *Attorney, Agent, or Firm* — Amin, Turocy & Watson, LLP

(57) ABSTRACT

A system that automatically delivers telephony network services from a dual mode service technology platform to an external entity. The system includes a sensing component that detects the presence of a mobile handset registered on a cellular network, and registers the mobile handset with a wireless access network. Further, a provisioning component identifies calls to subscribers that are provisioned for the requested telephony network service. Once the calls are identified, the provisioning component extracts the requested data from the incoming calls and routes the data to an external entity for display.

20 Claims, 13 Drawing Sheets

(56) References Cited

U.S. PATENT DOCUMENTS

| | | | |
|---|---|---|---|
| 7,668,303 B2 | 2/2010 | Peters et al. | |
| 7,809,381 B2 | 10/2010 | Aborn et al. | |
| 8,090,402 B1* | 1/2012 | Fujisaki | 455/556.1 |
| 8,160,222 B2* | 4/2012 | White et al. | 379/142.17 |
| 2002/0080161 A1* | 6/2002 | St. Maurice et al. | 345/719 |
| 2003/0058838 A1 | 3/2003 | Wengrovitz et al. | |
| 2003/0190024 A1 | 10/2003 | Ju et al. | |
| 2004/0049545 A1* | 3/2004 | Lockridge et al. | 709/206 |
| 2004/0052341 A1 | 3/2004 | Yeh et al. | |
| 2004/0083493 A1* | 4/2004 | Swisher et al. | 725/106 |
| 2004/0176142 A1* | 9/2004 | Thrasher | 455/566 |
| 2005/0002407 A1 | 1/2005 | Shaheen et al. | |
| 2005/0074105 A1 | 4/2005 | Corbett et al. | |
| 2006/0041923 A1* | 2/2006 | McQuaide, Jr. | 725/131 |
| 2006/0187904 A1 | 8/2006 | Oouchi et al. | |
| 2006/0225108 A1* | 10/2006 | Tabassi et al. | 725/100 |
| 2006/0251229 A1* | 11/2006 | Gorti et al. | 379/142.02 |
| 2006/0262913 A1* | 11/2006 | Cook et al. | 379/88.19 |
| 2006/0271687 A1* | 11/2006 | Alston et al. | 709/227 |
| 2007/0036136 A1 | 2/2007 | Barclay et al. | |
| 2007/0053343 A1 | 3/2007 | Suotula et al. | |
| 2007/0058637 A1 | 3/2007 | Lo et al. | |
| 2007/0079340 A1 | 4/2007 | McEnroe et al. | |
| 2007/0083470 A1 | 4/2007 | Bonner et al. | |
| 2007/0146476 A1 | 6/2007 | Son | |
| 2009/0122786 A1 | 5/2009 | Liu et al. | |

OTHER PUBLICATIONS

Final OA mailed Sep. 25, 2008 for U.S. Appl. No. 11/256,130, 10 pages.
OA dated Jan. 31, 2012 for U.S. Appl. No. 13/251,776, 16 pages.
Oa dated Jun. 27, 2012 for U.S. Appl. No. 13/251,776, 10 pages.
Notice of Allowance dated Nov. 7, 2012 for U.S. Appl. No. 13/251,776, 9 pages.

* cited by examiner

DISPLAY CALLER ID ON IPTV SCREEN

CROSS REFERENCE TO RELATED APPLICATIONS

This application is a continuation of U.S. patent application Ser. No. 13/251,776, filed on Oct. 3, 2011, entitled "DISPLAY CALLER ID ON IPTV SCREEN", which is a continuation of U.S. patent application Ser. No. 12/390,519 (now U.S. Pat. No. 8,064,906), filed on Feb. 23, 2009, entitled "DISPLAY CALLER ID ON IPTV SCREEN", which is a continuation of U.S. patent application Ser. No. 11/256,130 (now U.S. Pat. No. 7,499,704), filed on Oct. 21, 2005, entitled "DISPLAY CALLER ID ON IPTV SCREEN." The entireties of the aforementioned applications are incorporated by reference herein.

BACKGROUND

The mobile telephone industry has been associated with tremendous growth over the last several years. Advances in technology relating to mobile devices in general, and mobile phones in particular, continue to occur. For example, recently mobile telephones have been designed to communicate over disparate networks and/or between licensed and unlicensed spectra. In more detail, a dual mode handset can connect to a cellular network to effectuate communications between a user of the mobile phone and another phone device, and can further connect via WiFi to a wireless local access network (LAN) and thereafter utilize the Voice over Internet Protocol (VoIP) to effectuate communication between users.

Implementation of this dual mode service is due at least in part to the Third Generation Partnership Project (3GPP), which have created specifications that define a mechanism that provides signal integrity for session initial protocol (SIP) signals between an IP multimedia subsystem (IMS) (P-SCCF) and user equipment (UE) (e.g., a mobile phone, a personal digital assistant, . . . ). The IMS represents a 3GPP and 3GPP2 effort to define an all-IP-based wireless network as a replacement for the various voice, data, signaling, and control network elements. Furthermore, the IMS enables support for IP multimedia applications within the Universal Mobile Telecommunications System (UMTS). The UMTS is a 3G broadband packet-based transmission of text, digitized voice, video, and multimedia that offers a consistent set of services to mobile computer and phone users regardless of their physical location.

The telecom industry is currently shifting towards all IP-systems, thereby rendering dual mode service handsets an important tool (as they are compatible with existing cellular systems and emerging IP-systems). This shift is driven by desires to reduce costs and create new streams of revenue while protecting an operator business model. IMS is a new service domain that facilitates this shift by enabling convergence of data, speech, and network technology over an IP-based infrastructure. For users, IMS-based services enable transmittal and receipt of various data at significantly reduced cost, including voice, text, pictures, video, and/or any combination thereof in a highly personalized and secure manner. In summary, IMS is designed to bridge the gap between existing, traditional telecommunications technology and Internet technology that increased bandwidth does not provide.

As stated above, these emerging IP-based technologies have created demand for dual mode services, and thus for dual mode handsets. Using this technology, users can employ WiFi to effectuate voice calls, transmission of data, and the like. In more detail, a user can connect to a LAN by way of WiFi. Upon such connection, users can employ services offered by their service provider.

Another emerging IP-based technology is the Internet Protocol Television (IPTV). The IPTV device provides bundled voice, data, and video services using the same Digital Subscriber Line (DSL) connection that gives customers broadband Internet access over phone lines. The IPTV device is an integrated and comprehensive software platform developed specifically to deliver broadcast-quality video and new, integrated television services over broadband networks. The platform combines features such as instant channel change (ICC) and multiple picture-in-picture (PIP) with traditional television services such as broadcast programming, video on demand (VOD), and digital video recording (DVR). The IPTV device uses unified configuration, operation, and management tools and interfaces to manage legacy back-office systems. The software is developed to integrate seamlessly and economically with other IP-based communications and media services for PCs, phones, and other consumer devices.

These emerging IP-based technologies have created a demand for integration, and thus for integration between dual mode handsets and IPTV devices. Using this technology, users can employ dual mode handsets to effectuate transmission of telephony network data to IPTV devices, and the like. In more detail, a user can display telephony network services, such as caller line identification (CLI) information, instant messages, text messages, e-mail or call forwarding information on the television.

DETAILED DESCRIPTION

Figure 1:
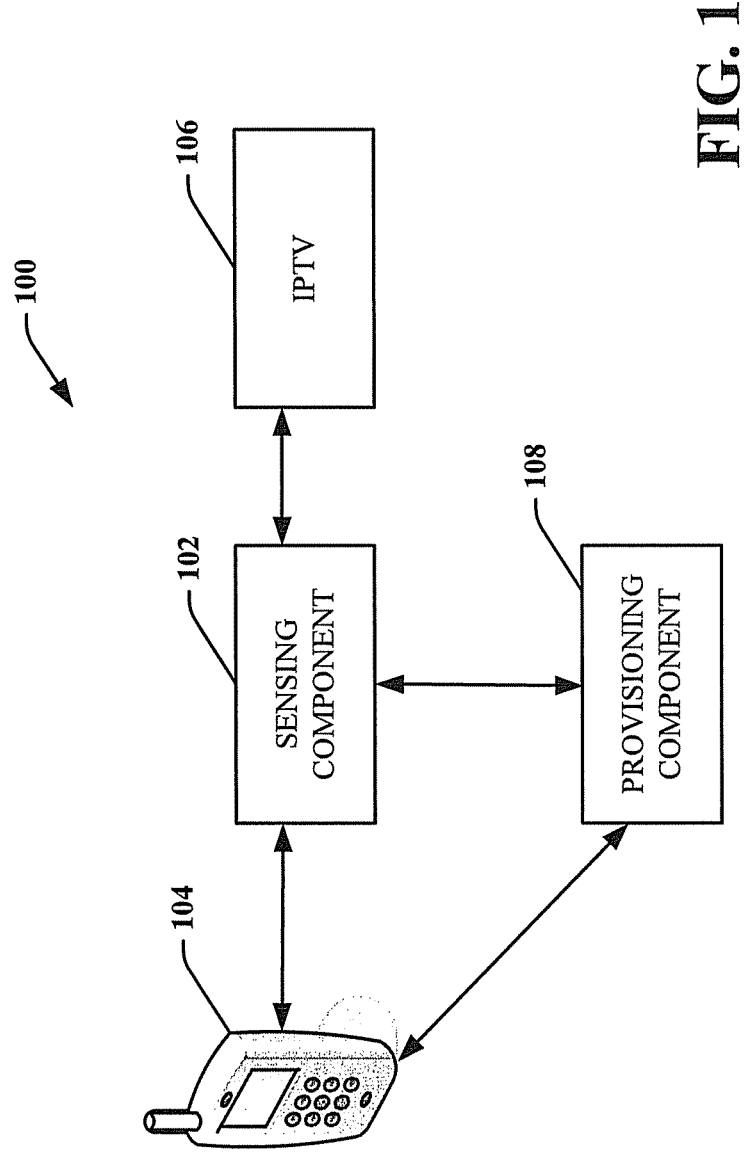
FIG. 1 illustrates a system that automatically delivers a telephony network service from a dual mode handset to an external entity.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such matter can be practiced without these specific details. In other instances, well-known structures and devices are shown in block diagram form in order to facilitate describing the claimed subject matter.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computing device, such as a mobile handset, to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

The subject matter described herein relates to automatically delivering a telephony network service from a dual mode service technology platform to an external entity. In more detail, it may be desirable to enable a dual mode handset user to display telephony network services on an external entity, such as an IPTV device. Conventionally, however, there has been no implementation of a system or method to undertake such action. In accordance with one aspect described herein, a dual mode handset registered on a cellular network is detected by an external entity. Once detected, the dual mode handset is registered with a wireless access network (WAN). Incoming calls to the dual mode handset are received and specific telephony network services are requested. If the mobile subscriber is provisioned for the specific telephony network services, the requested data associated with the telephony network services is extracted from incoming calls to the dual mode handset. The requested data is then routed to the external entity for display. Accordingly, a mobile subscriber of a dual mode handset can display specific telephony network services from incoming calls on an external entity, such as an IPTV device.

By way of another example, the requested data is routed to the IPTV device by way of a Session Initiation Protocol (SIP) MESSAGE. In more detail, a SIP messaging client coupled to the IPTV set-top box (STB) verifies subscription services for a mobile subscriber. The SIP messaging client sends subscription requests for telephony network services to a SIP Application Server (AS). The requested data is extracted from the incoming calls and routed to the SIP AS in the form of SIP MESSAGES. The SIP AS delivers the SIP MESSAGES to the SIP messaging client. The SIP messaging client decodes the requested data in the SIP MESSAGES and displays it on the IPTV device. In still another example, the requested data is routed to a proxy that communicates with the IPTV device and dual mode handset to display the requested data. Thus, a mobile subscriber can display requested telephony network data on an IPTV device without use of a set-top box.

By way of yet another example, the system for delivering telephony network services from a dual mode handset to an external entity comprises a network data store. The dual mode handset leaves the home and moves into the macro network. Once the dual mode handset is no longer detected by the external entity, the dual mode handset registers with the cellular network. Accordingly, telephony network data from incoming calls received by the dual mode handset is displayed on the dual mode handset. Additionally, the requested telephony network data is also routed to a network data store. The network data store maintains a list of the requested data associated with the dual mode handset, such that the requested data can be queried by the external entity at a later date.

To the accomplishment of the foregoing and related ends, certain illustrative aspects are described herein in connection with the following description and the annexed drawings. These aspects are indicative, however, of but a few of the various ways in which the principles disclosed herein can be employed and is intended to include all such aspects and their equivalents. Various features will become apparent from the following detailed description when considered in conjunction with the drawings.

Turning now to the drawings, FIG. 1 illustrates a system 100 that automatically delivers telephony network services from a dual mode service technology platform to an external entity. The system 100 includes a mobile handset 104 which is associated with dual mode capabilities. In other words, the mobile handset 104 can be utilized for communications by way of a conventional cellular network as well as through a wireless LAN or other suitable network. In more detail, Unlicensed Mobile Access (UMA) technologies enable mobile handsets (e.g., dual mode handsets) to access mobile services, such as the Global System for Mobile communications (GSM) and General Packet Radio Service (GPRS), over unlicensed spectrum technologies, such as IP Multimedia Subsystem (IMS), Bluetooth, IEEE 802.11a/b/g, and the like. Utilizing UMA technologies enables mobile service subscribers to roam and/or handover seamlessly between private, unlicensed networks, GSM networks, Local Area Networks (LANs), and the Public Switched Telephone Network (PSTN) utilizing a single dual mode device. Furthermore, UMA technologies enable mobile phones to receive data designed in accordance with IP protocols. Thus, mobile handsets can receive, execute, and transmit speech, multimedia, a combination of speech and multimedia, and/or various other data.

Further, the dual mode handset of system 100 subscribes to various telephony network services. The telephony network services include, but are not limited to, caller line identification (CLI) services, call forwarding services, text messaging services, email services, instant messaging services, etc. It is thus to be understood that any suitable services that can be extracted from mobile phone, PDA or PC communications is contemplated and intended to fall under the scope of the hereto-appended claims.

The system 100 delivers the subscribed telephony network services from the dual mode handset to an external entity for display. The external entity is any internet-capable device. In one example, the external entity is an Internet Protocol Television (IPTV). An IPTV device is an integrated and comprehensive software platform developed specifically to deliver broadcast-quality video and integrated television services over broadband networks. The platform combines features such as ICC and multiple PIP with traditional television services such as broadcast programming, VOD, and DVR. The software is developed to integrate seamlessly with other IP-based communications and media services for PCs, phones, and other consumer devices.

Typically, the IPTV device is coupled to a standard television set or LCD/plasma monitor via a set-top box or proxy. However, the IPTV device could also be integrated within the standard television set via internal software and/or hardware. If the IPTV device is coupled to a proxy, the proxy would act as an intermediary between the user and the IPTV device so that the service provider can ensure security and administrative control of the IPTV device. The proxy would receive a request for a television service, station, etc. from a user, and if it passes filtering requirements, the proxy would download the requested information and/or services to the standard television set or LCD/plasma monitor.

Accordingly, the system 100 enables subscribed telephony network services received from the dual mode handset 104 to be displayed on the IPTV device 106. In more detail, the system 100 includes a sensing component 102 that is operatively coupled to the IPTV device 106. The sensing component 102 detects the presence of the dual mode handset 104 registered on a cellular network, and then registers the dual mode handset 104 with a wireless access network (WAN). For instance, the dual mode handset 104 can be a dual mode handset registered on a GSM network or any other suitable cellular network; once detected by the sensing component 102, the dual mode handset is then registered on an IMS network, a Bluetooth network, an IEEE 802.11a/b/g network or any other suitable WAN. In one particular example, the dual mode handset 104 can utilize WiFi in connection with registering with a WAN. Furthermore, the dual mode handset 104 can automatically attempt to access a WAN associated with the IPTV device 106 upon becoming physically proximate to the sensing component 102. For instance, a sensor within the IPTV device 106 can detect WiFi signals output by the dual mode handset 104 and thereafter register the dual mode handset 104 with a WAN associated with the IPTV device 106. It is thus to be understood that any suitable manner for registering the dual mode handset 104 with a WAN associated with the IPTV device 106 is contemplated and intended to fall under the scope of the hereto-appended claims.

Further, a provisioning component 108 is communicatively coupled to the sensing component 102 to identify calls to subscribers that are provisioned for the specific telephony network service. The provisioning component 108 extracts the requested data from the call set-up messages and routes the data to the IPTV device 106 for display. For instance, a service provider associated with the dual mode handset 104 may not wish to allow the user of the dual mode handset 104 access to the specific telephony network data requested. In more detail, mobile telephone service providers only allow access to telephony network services that users have subscribed to. When a subscriber requests specific telephony network service(s), the provisioning component 108 determines if the subscriber is provisioned for the services requested. If the subscriber is provisioned, the provisioning component 108 extracts the requested data from the call set-up message and routes the requested data to the IPTV device 106 for display. The requested data corresponds to the telephony network services. For instance, if CLI information is requested, then a name of the caller or E. 164 call back telephone number would be extracted from the call set-up message. If email, text messaging or instant messaging is requested, then the message text is extracted from the call set-up messages. It is thus to be understood that any text, names, telephone numbers, etc. that can be extracted from mobile phone, PDA or PC communications is contemplated as requested data and intended to fall under the scope of the hereto-appended claims.

To better illustrate operability of the system 100, a detailed example of one particular utilization of such system 100 is provided herein. This example, however, is meant to aid in understanding of the system 100 and is not intended to limit use or operability of such system 100. A customer can purchase a dual mode handset from a service provider, wherein such handset is configured to operate in accordance with GSM (or other suitable cellular network) and through wireless LANs. Thus, the customer can utilize the dual mode handset 104 in connection with UMA service, and a profile can exist for such customer at a database associated with the service provider. As the customer leaves the retail establishment and returns to their home, the dual mode handset 104 is detected by the IPTV device 106 and registered with the IMS network (or other suitable WAN) by way of the sensing component 102. The dual mode handset 104 then receives a call and makes a request for CLI information related to that specific call. The provisioning component 108 confirms that the customer has subscribed to the requested CLI service via the service provider. If the customer is a subscriber of the requested CLI service, the provisioning component 108 extracts the requested CLI data from the call set-up message and routes the requested data to the IPTV device 106 for display. The subscriber can thereafter display CLI information from incoming calls on their IPTV device while within the home.

Figure 2:
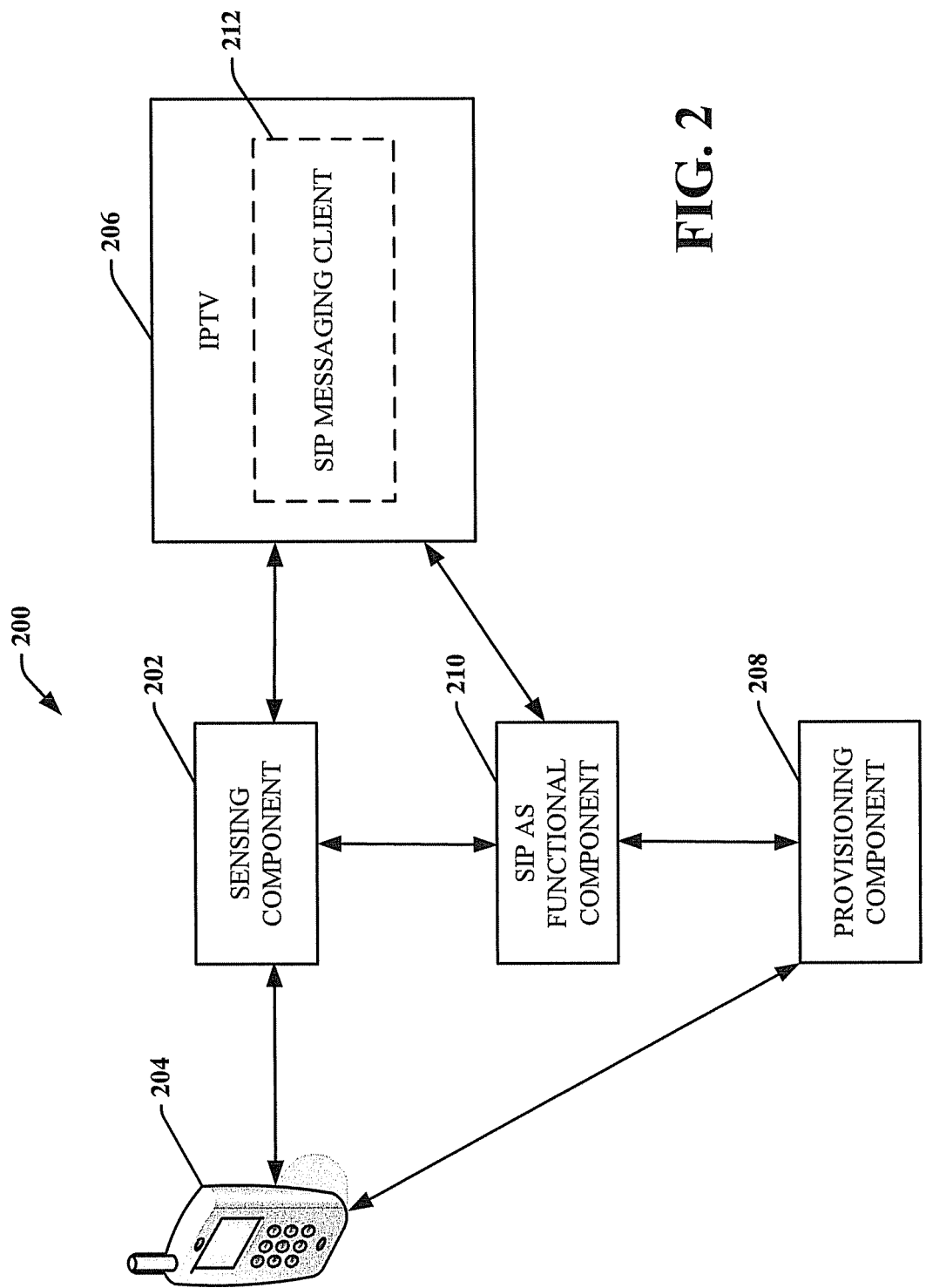
FIG. 2 illustrates a telephony network service delivery system, wherein SIP MESSAGES are used to route the requested data.

FIG. 2 illustrates the system 200 wherein subscribed telephony network services received from a dual mode handset 204 are displayed on the IPTV device 206 by way of Session Initiation Protocol (SIP) messaging. The system 200 includes a mobile handset 204 which is associated with dual mode capabilities. The system 200 also includes the sensing component 202 and the provisioning component 208 that were described in detail above. The exemplary system 200 further comprises a SIP Application Server (AS) service functional component 210 to communicate the requested data by way of SIP MESSAGES to the IPTV device 206. In more detail, the SIP AS component 210 communicates with a SIP messaging client 212 to determine subscribed telephony network services. The SIP messaging client 212 is coupled to the IPTV device 206 and determines the subscription services for a specific mobile subscriber. The SIP messaging client 212 then sends requests for specific services based on the mobile subscriber's subscription (subscription requests) to the SIP AS component 210. The SIP AS component 210 then communicates with the provisioning component 208 identifying the subscription requests, such that the requested data can be extracted from the identified call set-up messages. The requested data is routed using SIP MESSAGES from the provisioning component 208 to the SIP AS component 210, and then to the SIP messaging client 212. The SIP messaging client 212 then decodes the requested data for display on the IPTV device 206.

In operation, the dual mode handset 204 is registered on the GSM network (or other suitable cellular network). The sensing component 202 detects the presence of the mobile handset 204, and registers the dual mode handset 204 with the IMS network (or other suitable WAN). The SIP messaging client 212 of the IPTV device 206 verifies the mobile subscriber's subscription services. For instance, the mobile subscriber has subscribed to the CLI service (or other suitable telephony network service). Once an incoming call is received, the SIP messaging client 212 sends a subscription request for CLI data from the incoming call to the SIP AS component 210. The SIP AS component 210 accepts the subscription request for CLI data from the SIP messaging client 212 and notifies the provisioning component 208 to extract the requested CLI data from the call set-up message. The provisioning component 208 extracts the requested CLI data and routes the requested data to the SIP AS component 210 in the form of a SIP MESSAGE. The SIP AS component 210 accepts the SIP MESSAGE from the provisioning component 208 and delivers it to the SIP messaging client 212. The SIP messaging client 212 receives the SIP MESSAGES from the SIP AS component 210 and decodes the SIP MESSAGE. The requested CLI data is then displayed on the IPTV device 206.

Figure 3:
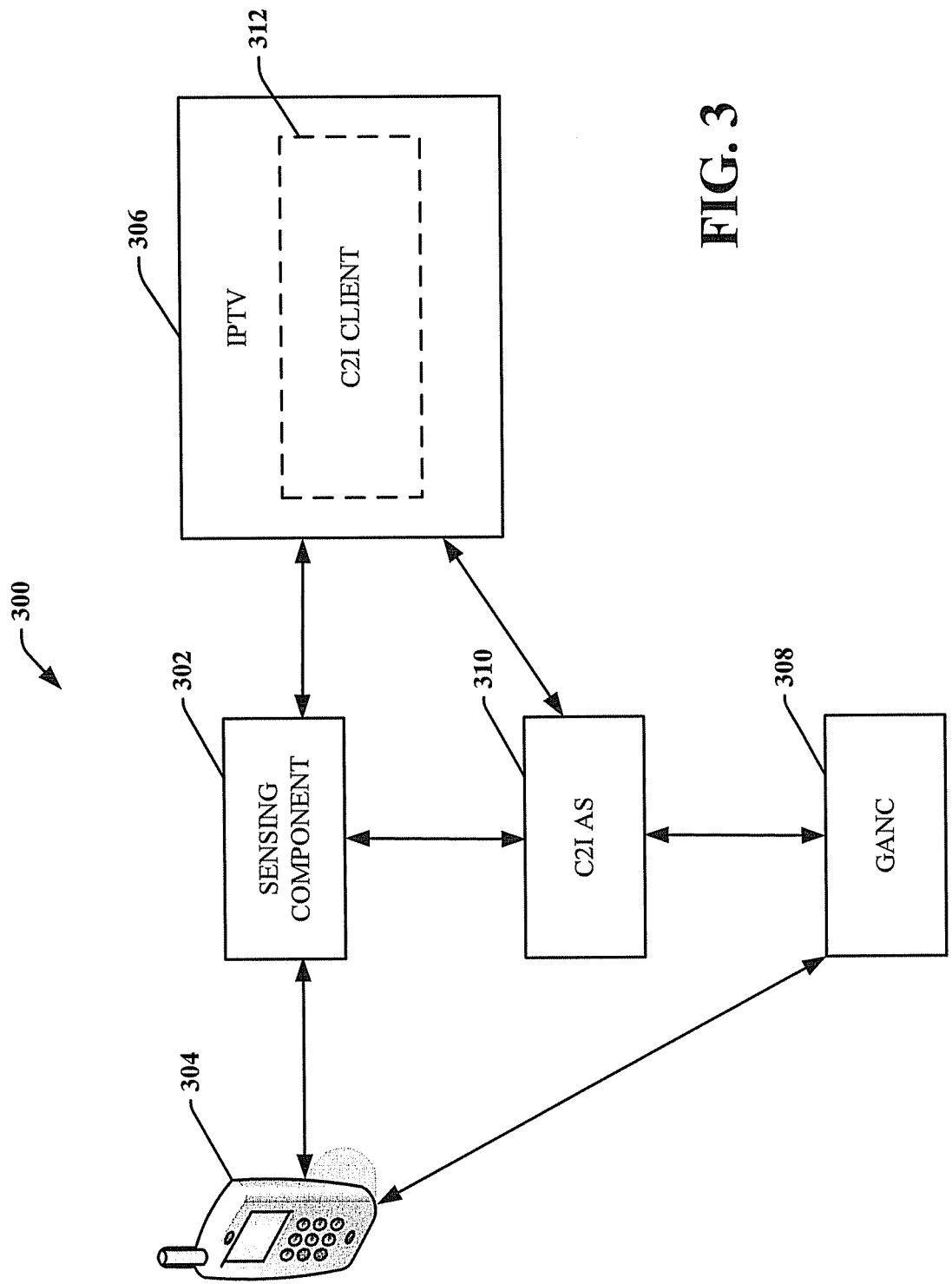
FIG. 3 illustrates a telephony network service delivery system, wherein a GANC is used to extract and route the requested data to the external entity.

Now referring to FIG. 3, the exemplary system 300 wherein the provisioning component is a Generic Access Network Controller (GANC) is illustrated. The system 300 includes a dual mode handset 304 and a sensing component 302 that communicates with an IPTV device 306, as described above. The system 300 also includes a GANC (provisioning component) 308, CLI to IPTV (C2I) AS (SIP AS component) 310 and C2I client (SIP messaging client) 312, that were described in detail above. In operation, the dual mode handset 304 is registered on a GSM network. A sensing component 302 detects the presence of the dual mode handset 304 and registers the dual mode handset 304 on an IMS network. The C2I client 312 of the IPTV device 306 verifies the mobile subscriber's subscription services. Once an incoming call is received, the C2I client 312 then registers the IPTV device 306 with the C2I AS 310 by sending subscription requests for the specific mobile subscriber to the C2I AS 310, i.e. a request for CLI data from incoming calls. The C2I AS component 310 accepts the subscription request for CLI data from the C2I client 312 and notifies the GANC 308 to extract the requested CLI data from the call set-up messages of the Mobile Terminated (MT) incoming calls for a specific mobile subscriber identity. The GANC 308 extracts the requested CLI data and routes the requested data to the C2I AS component 310 in the form of a SIP MESSAGE. The C2I AS component 310 accepts the SIP MESSAGE from the GANC 308 and delivers it to the C2I client 312. The C2I client 312 receives the SIP MESSAGES from the C2I AS component 310 and decodes the SIP MESSAGE. The requested CLI data is then displayed on the IPTV device 306.

Figure 4:
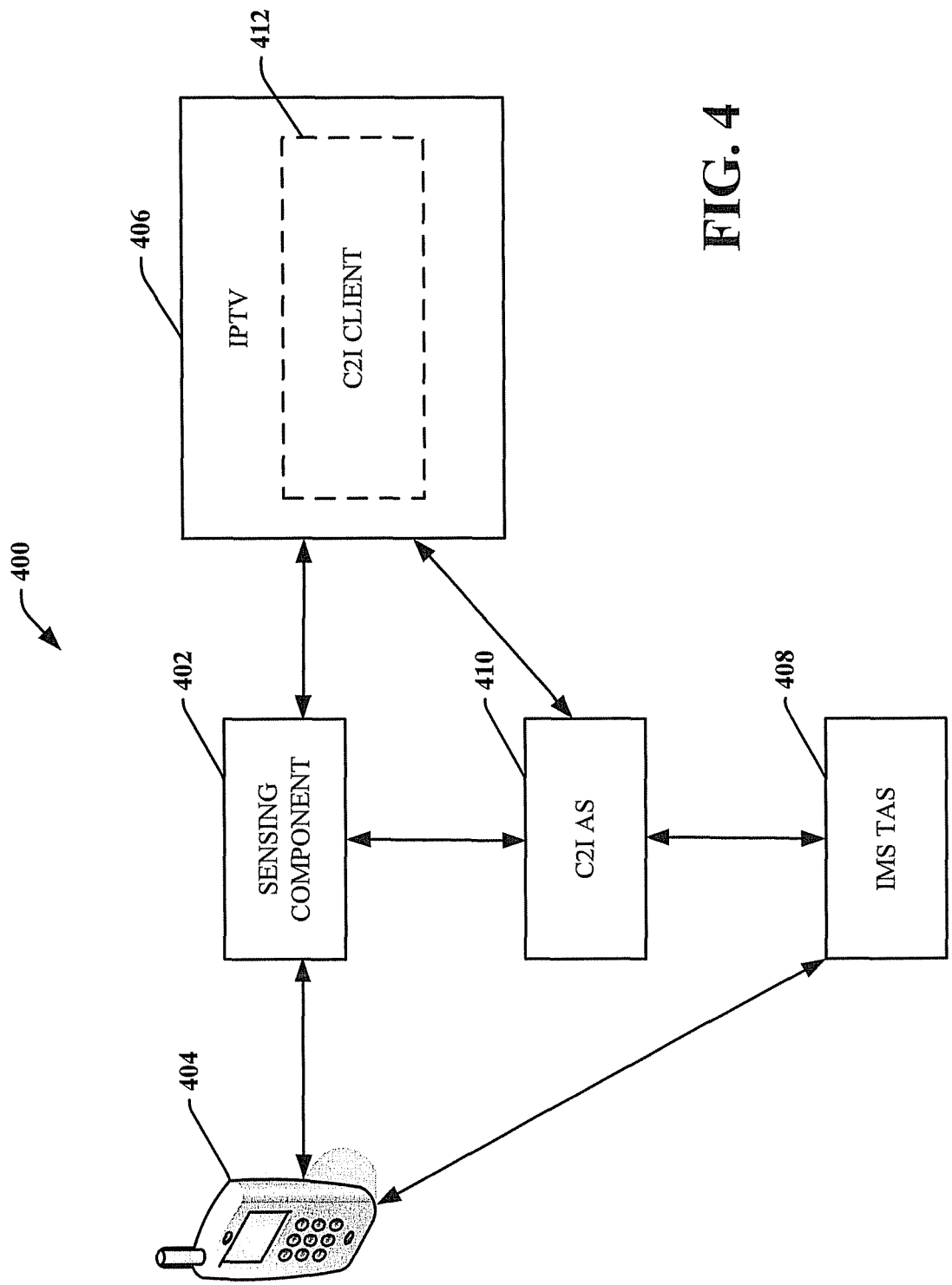
FIG. 4 illustrates a telephony network service delivery system, wherein an IMS TAS is used to extract and route the requested data to the external entity.

Turning now to FIG. 4, the exemplary system 400 wherein the provisioning component is an IMS Telephony Application Server (TAS) is illustrated. The system 400 includes a dual mode handset 404 and a sensing component 402 that communicates with an IPTV device 406, as described above. The system 400 also includes an IMS TAS (provisioning component) 408, C2I AS 410 and C2I client 412, that were described in detail above. In operation, the dual mode handset 404 is registered on a GSM network. A sensing component 402 detects the presence of the dual mode handset 404 and registers the dual mode handset 404 on an IMS network. The C2I client 412 of the IPTV device 406 verifies the mobile subscriber's subscription services. Once an incoming call is received, the C2I client 412 then registers the IPTV device 406 with the C2I AS 410 by sending subscription requests for the specific mobile subscriber to the C2I AS 410, i.e. a request for CLI data from incoming calls. The C2I AS component 410 accepts the subscription request for CLI data from the C2I client 412 and notifies the IMS TAS 408 to extract the requested CLI data from the call set-up messages of the MT incoming calls for a specific mobile subscriber identity. The IMS TAS 408 extracts the requested CLI data and routes the requested data to the C2I AS component 410 in the form of a SIP MESSAGE. The C2I AS component 410 accepts the SIP MESSAGE from the IMS TAS 408 and delivers it to the C2I client 412. The C2I client 412 receives the SIP MESSAGES from the C2I AS component 410 and decodes the SIP MESSAGE. The requested CLI data is then displayed on the IPTV device 406.

Figure 5:
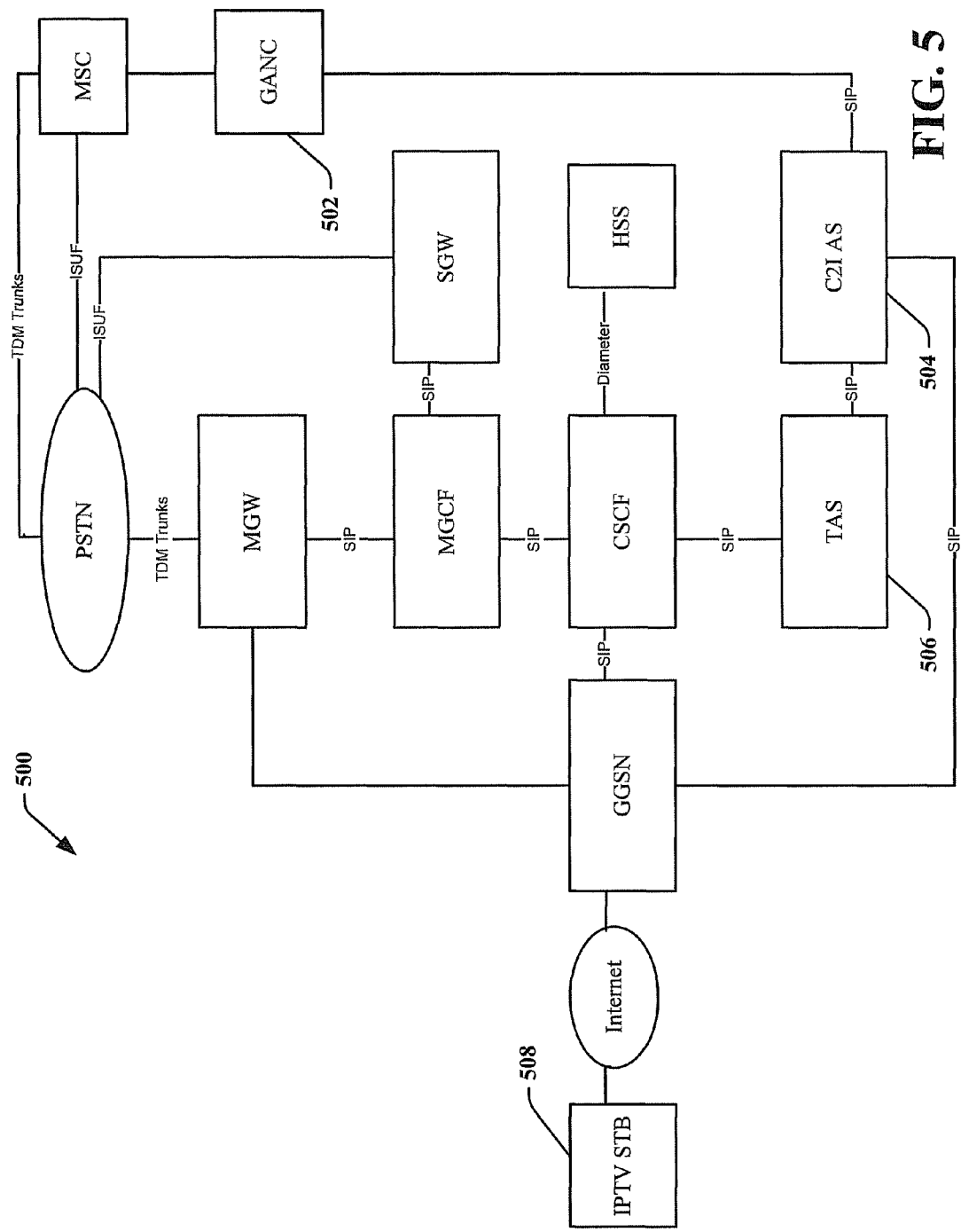
FIG. 5 illustrates a telephony network service delivery system that discloses two alternative approaches to extract and route the requested data to the external entity.

Now referring to FIG. 5, a system 500 that automatically delivers CLI data from a dual mode handset to an IPTV set-top box (STB) is illustrated. The exemplary system 500 includes typical mobile telephone architecture, and for the sake of brevity, these existing elements will not be discussed herein as the elements and their services remain unchanged. The system 500 discloses two alternative approaches for delivering CLI data from a dual mode handset to an IPTV STB. As illustrated in FIGS. 3 and 4 above, incoming calls for system 500 are either filtered by the GANC 502 or IMS TAS 506. In the first approach illustrated in FIG. 5, an incoming call is received through the Mobile Services Switching Center (MSC) and routed to the GANC 502. The GANC 502 then filters CLI data from the call setup message and routes the CLI data in the form of a SIP MESSAGE to the C2I AS 504. The C2I AS 504 routes the SIP MESSAGE through the Gateway GPRS Support Node (GGSN) to the Internet and finally to the IPTV STB 508. The IPTV STB 508 then communicates with the IPTV to display the CLI data.

In the second approach, illustrated in FIG. 5, an incoming call is received through the IMS and routed to the TAS 506. The TAS 506 then filters CLI data from the call setup message (SIP INVITE) and routes the CLI data in the form of a SIP MESSAGE to the C2I AS 504. The C2I AS 504 routes the SIP MESSAGE through the Gateway GPRS Support Node (GGSN) to the Internet and finally to the IPTV STB 508. The IPTV STB 508 then communicates with the IPTV to display the CLI data.

Figure 6:
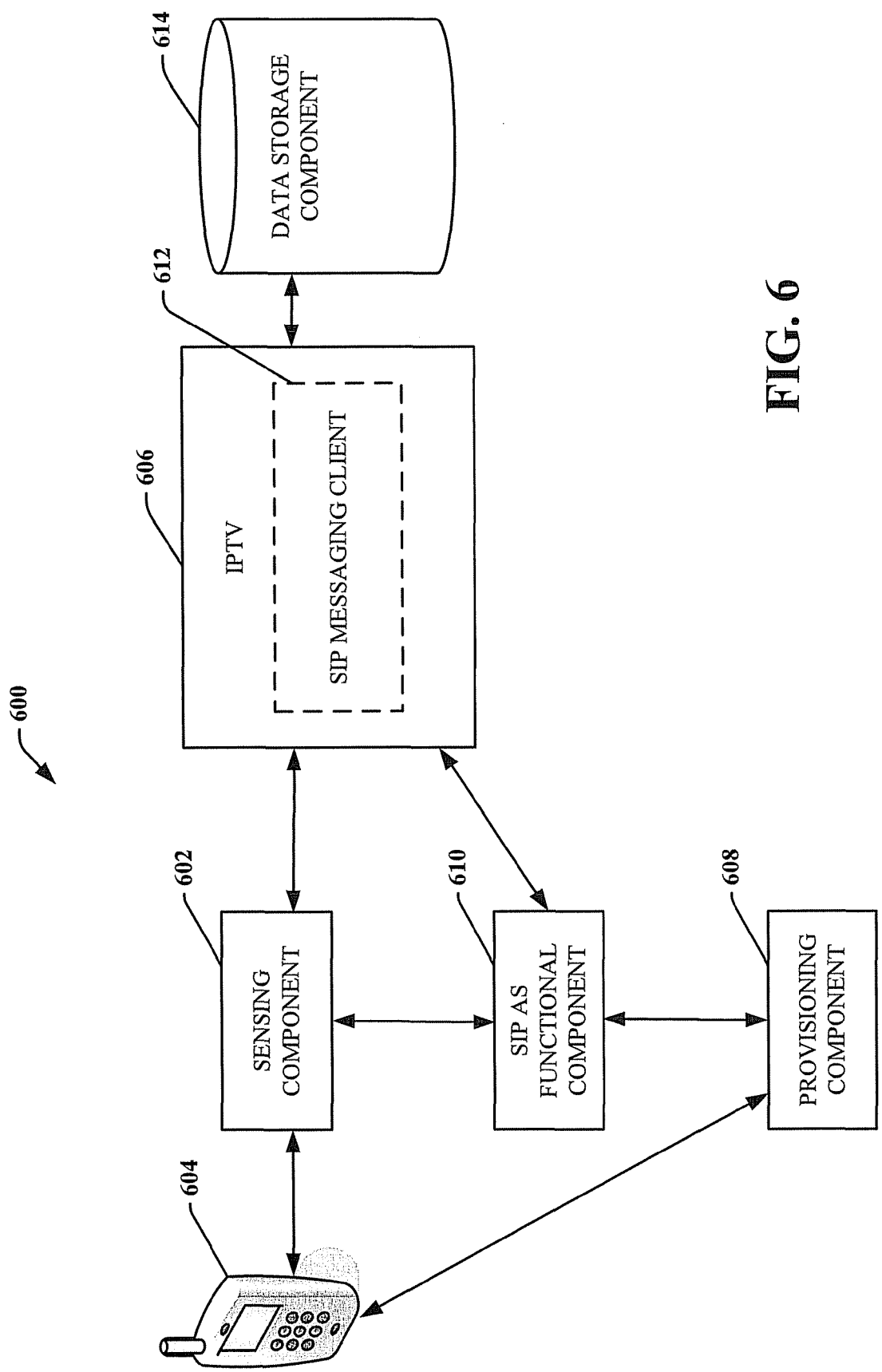
FIG. 6 illustrates a telephony network service delivery system that further comprises a data storage component.

Now referring to FIG. 6, the system 600 for delivering telephony network services from a dual mode handset to an IPTV device, further comprising a data storage component is illustrated. The system 600 includes a dual mode handset 604, a sensing component 602, a provisioning component 608, a SIP AS component 610 and SIP messaging client 612, that were described in detail above. The system 600 further includes a data storage component 614 that receives CLI data from the dual mode handset 604 and stores the data to be retrieved by the IPTV device 606. In operation, the dual mode handset 604 leaves the home and moves into the macro network. Once the sensing component 602 no longer detects the presence of the dual mode handset 604, the dual mode handset 604 registers with the GSM network. Accordingly, CLI data from incoming calls received by the dual mode handset 604 is displayed on the dual mode handset 604. Additionally, the requested telephony network data is also routed to a network data storage component 614. The network data storage component 614 maintains a list of the requested data associated with the dual mode handset 604, such that the requested data can be queried by the IPTV device 606 at a later date. This list can be monitored and analyzed each time the dual mode handset 604 registers with the WAN.

Referring to FIGS. 7-10, methodologies in accordance with various aspects of the claimed subject matter are illustrated. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 7:
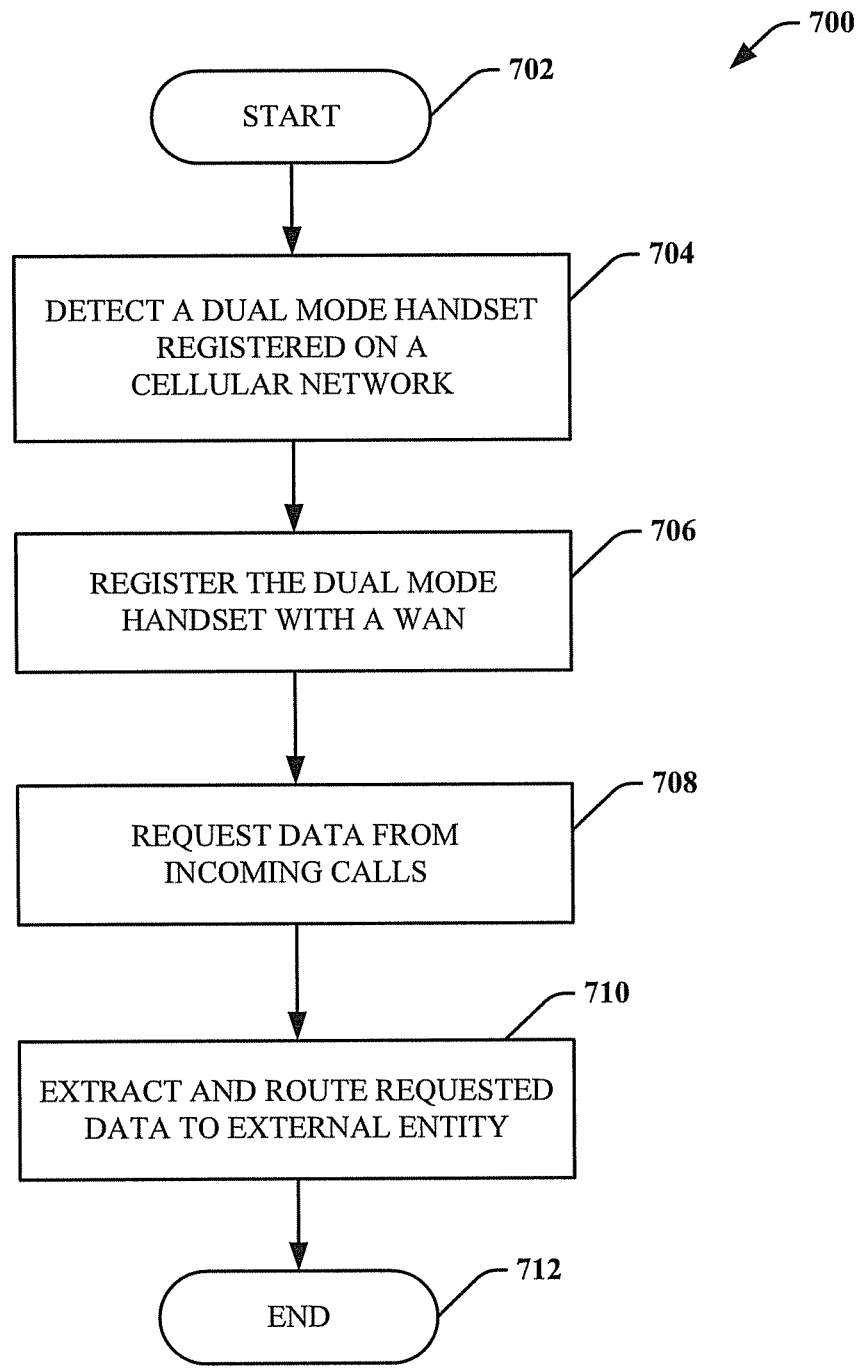
FIG. 7 is a flow diagram that is representative of a methodology for a telephony network service delivery system.

Turning specifically to FIG. 7, a methodology 700 for automatically delivering a telephony network service from a dual mode handset to an external entity is illustrated. The methodology 700 begins at 702, and at 704 a dual mode handset registered on a cellular network is detected. At 706, the dual mode handset is registered on a WAN. For instance, the dual mode handset can access the WAN via WiFi signals or any other suitable manner. The methodology 700 then proceeds to 708, where a request is made for data associated with the telephony network service from the incoming call. This request can relate to CLI information, call forwarding information, text messaging information, instant messaging information, email information or any other suitable telephony network information. At 710, the requested data corresponding to the telephony network service is extracted and routed to the external entity for display. The external entity is an IPTV device or any other internet-capable device. The methodology 700 ends at 712.

Figure 8:
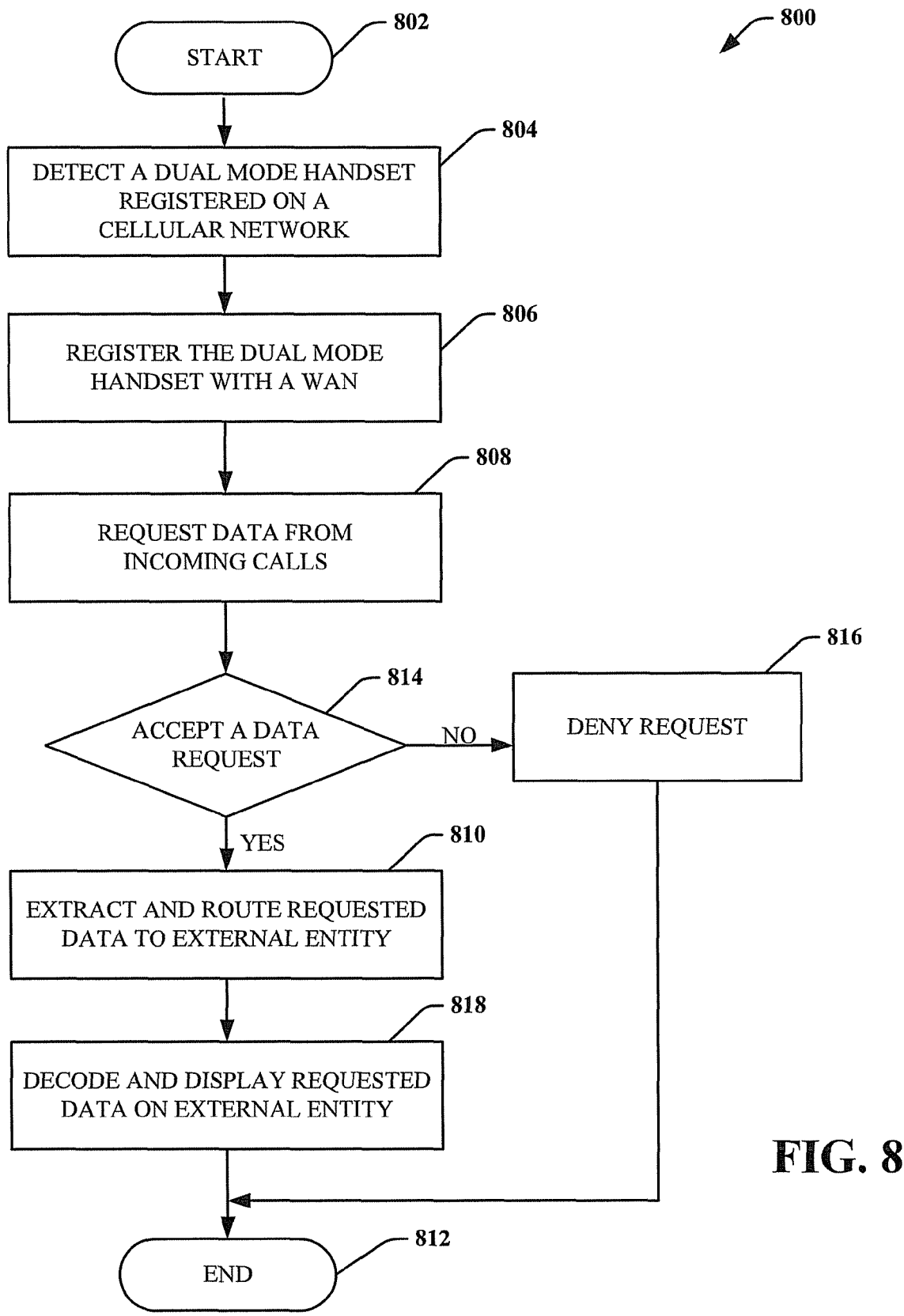
FIG. 8 is a flow diagram that is representative of a methodology for the telephony network service delivery system, wherein SIP MESSAGES are used to route the requested data.

Now turning to FIG. 8, a methodology 800 for delivering a telephony network service from a dual mode handset to an external entity utilizing SIP MESSAGES is illustrated. The methodology 800 begins at 802, and at 804 the dual mode handset registered on a cellular network is detected. At 806, the dual mode handset is registered on a WAN. At 808, a request is made for data associated with the telephony network service from the incoming call. This request can be made through any suitable manner, including via a SIP MESSAGE or other messaging protocol, etc. The methodology 800 then proceeds to decision block 814, where a determination is made regarding whether a data request should be accepted. If the data request is not accepted, then at 816 the data request is denied. If the data request is accepted, then at 810 the data corresponding to the telephony network service is extracted and routed to the external entity. At 818, the data, in the form of a SIP MESSAGE (or any other suitable protocol), is decoded and displayed on the external entity. The methodology 800 completes at 812.

Figure 9:
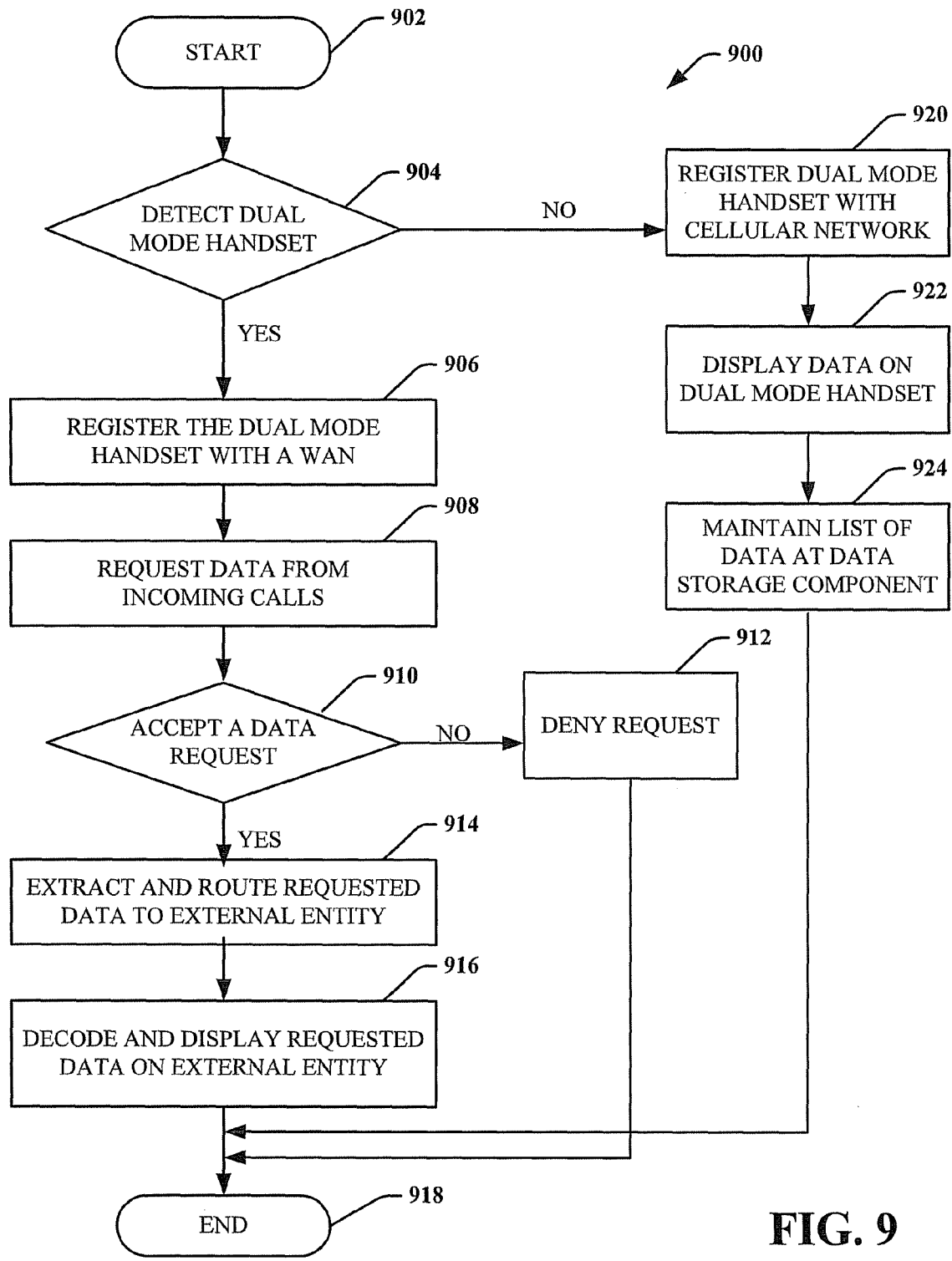
FIG. 9 is a flow diagram that is representative of a methodology for the telephony network service delivery system, further comprising a data storage component.

Referring now to FIG. 9, a methodology 900 for delivering a telephony network service from a dual mode handset to an external entity further comprising a data storage component is illustrated. The methodology 900 begins at 902, and at 904 it is determined if the dual mode handset is detected. If the dual mode handset is not detected, then at 920 the dual mode handset is registered with a cellular network. At 922, telephony network data is displayed on the dual mode handset. At 924, a list of the data is maintained at a network data storage component. If the handset is detected, then at 906 the dual mode handset is registered on a WAN. At 908, a request is made for data associated with the telephony network service from the incoming call. The methodology 900 then proceeds to decision block 910, where a determination is made regarding whether a data request should be accepted. If the data request is not accepted, then at 912 the data request is denied. If the data request is accepted, then at 914 the data corresponding to the telephony network service is extracted and routed to the external entity. At 916, the data is decoded and displayed on the external entity. The methodology 900 completes at 918.

Figure 10A:
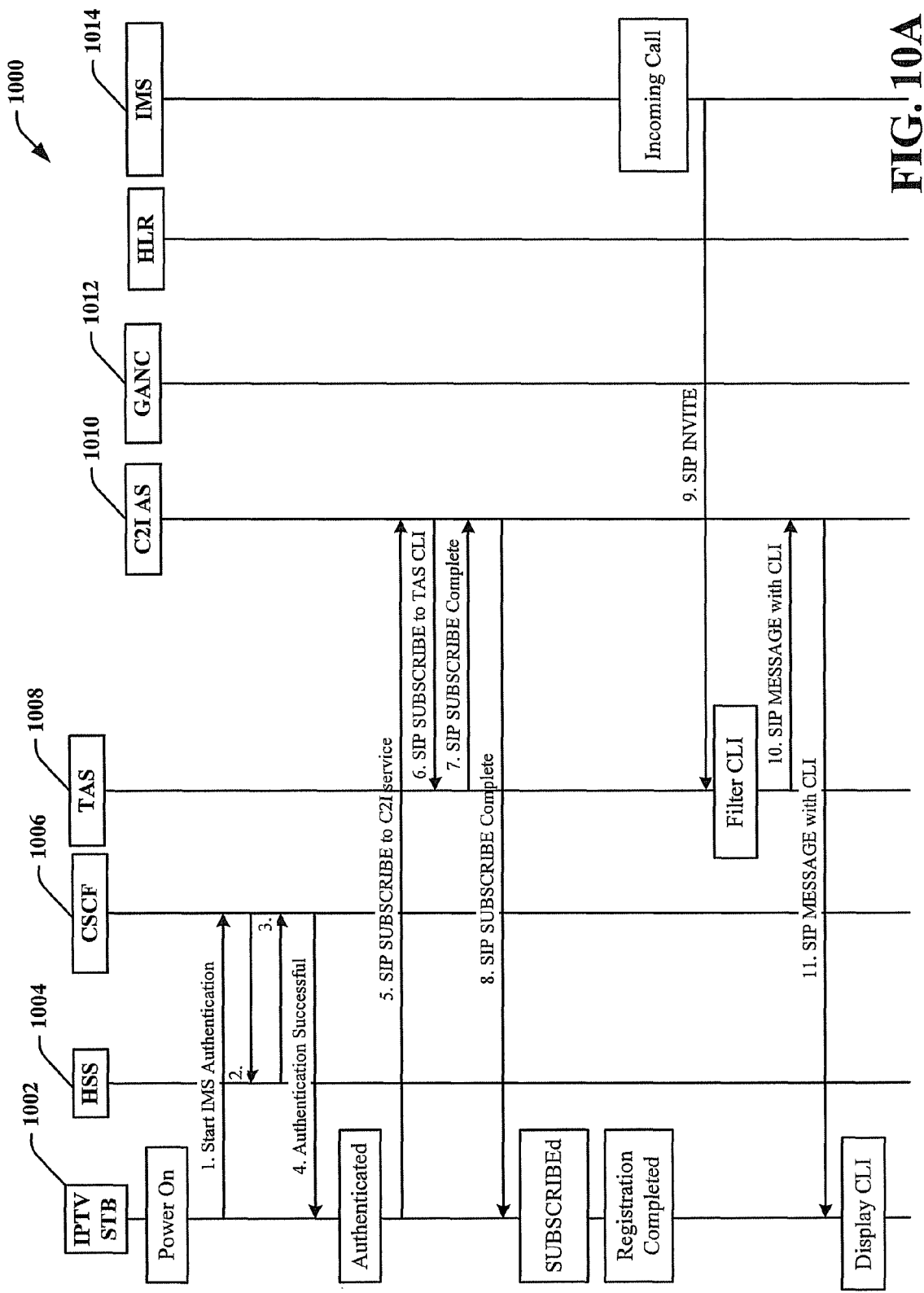
FIG. 10A illustrates a call flow diagram registration routing between an IPTV STB and a C2I AS via the IMS TAS in accordance with embodiments.

FIG. 10A illustrates a call flow diagram 1000 registration routing between an IPTV STB and a C2I AS via the IMS CSCF in accordance with an embodiment. The first step in registration is authenticating the IPTV STB 1002. Authentication is initiated from the IPTV STB 1002 to the Call Session Control Function (CSCF) 1006. From the CSCF 1006, the authentication notification is passed to the Home Subscriber Server (HSS) 1004, then back to the CSCF 1006. From the CSCF 1006, authentication notification is passed back to the IPTV STB 1002, with authentication of the STB complete. Next, a SIP SUBSCRIBE message is sent to the C2I AS 1010. From the C2I AS 1010, the SUBSCRIBE complete message is routed to the IPTV STB 1002 and registration is complete.

After the IPTV STB 1002 has been registered with the C2I AS 1010, CLI data from incoming calls can be displayed on the IPTV. When an incoming call is received in the IMS 1014, a SIP INVITE is routed to the TAS 1008. The TAS 1008 filters out the CLI data from the incoming call and sends the CLI data in the form of a SIP MESSAGE to the C2I AS 1010. From the C2I AS 1010, the SIP MESSAGE is routed to the IPTV STB 1002 which displays the requested CLI data on the IPTV.

Figure 10B:
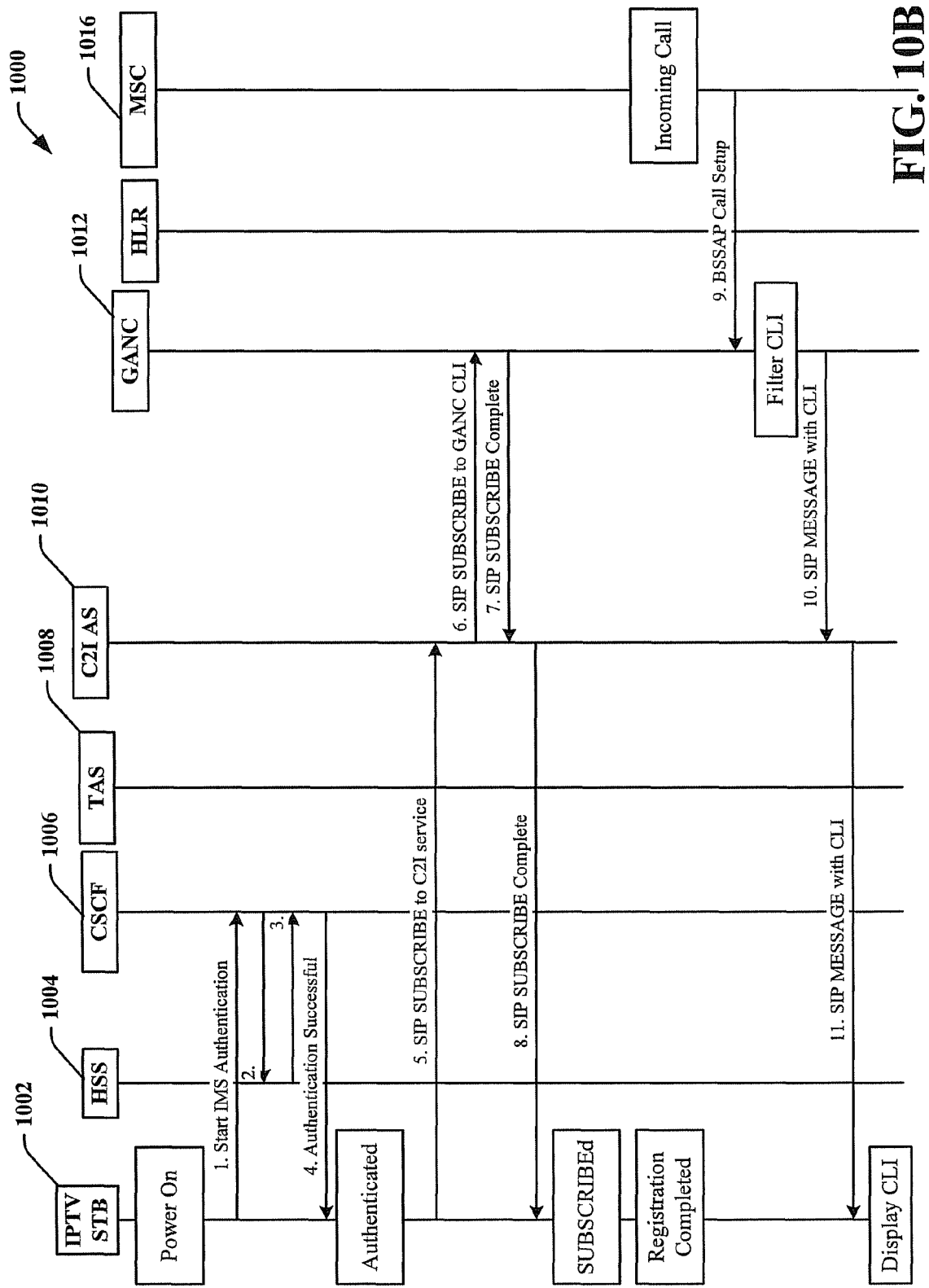
FIG. 10B illustrates a call flow diagram registration routing between an IPTV STB and a C2I AS via the GANC in accordance with an embodiment.

Referring now to FIG. 10B illustrates a call flow diagram 1000 registration routing between an IPTV STB and a C2I AS via the GANC in accordance with an embodiment. The first step in registration is authenticating the IPTV STB 1002. Authentication is initiated from the IPTV STB 1002 to the CSCF 1006. From the CSCF 1006, the authentication notification is passed to the HSS 1004, then back to the CSCF 1006. From the CSCF 1006, authentication notification is passed back to the IPTV STB 1002, with authentication of the STB complete. Next, a SIP SUBSCRIBE message is sent to the C2I AS 1010. From the C2I AS 1010, the SUBSCRIBE verification message is routed to the IPTV STB 1002 and registration is complete.

After the IPTV STB 1002 has been SUBSCRIBED with the C2I AS 1010, CLI data from incoming calls can be displayed on the IPTV. When an incoming call is received in the Mobile Services Switching Center (MSC) 1016, the Base Station System Application Part (BSSAP) call setup message is routed to the GANC 1012. The GANC 1012 filters out the CLI data from the BSSAP call setup message and sends the CLI data in the form of a SIP MESSAGE to the C2I AS 1010. From the C2I AS 1010, the SIP MESSAGE is routed to the IPTV STB 1002 which displays the requested CLI data on the IPTV.

Figure 11:
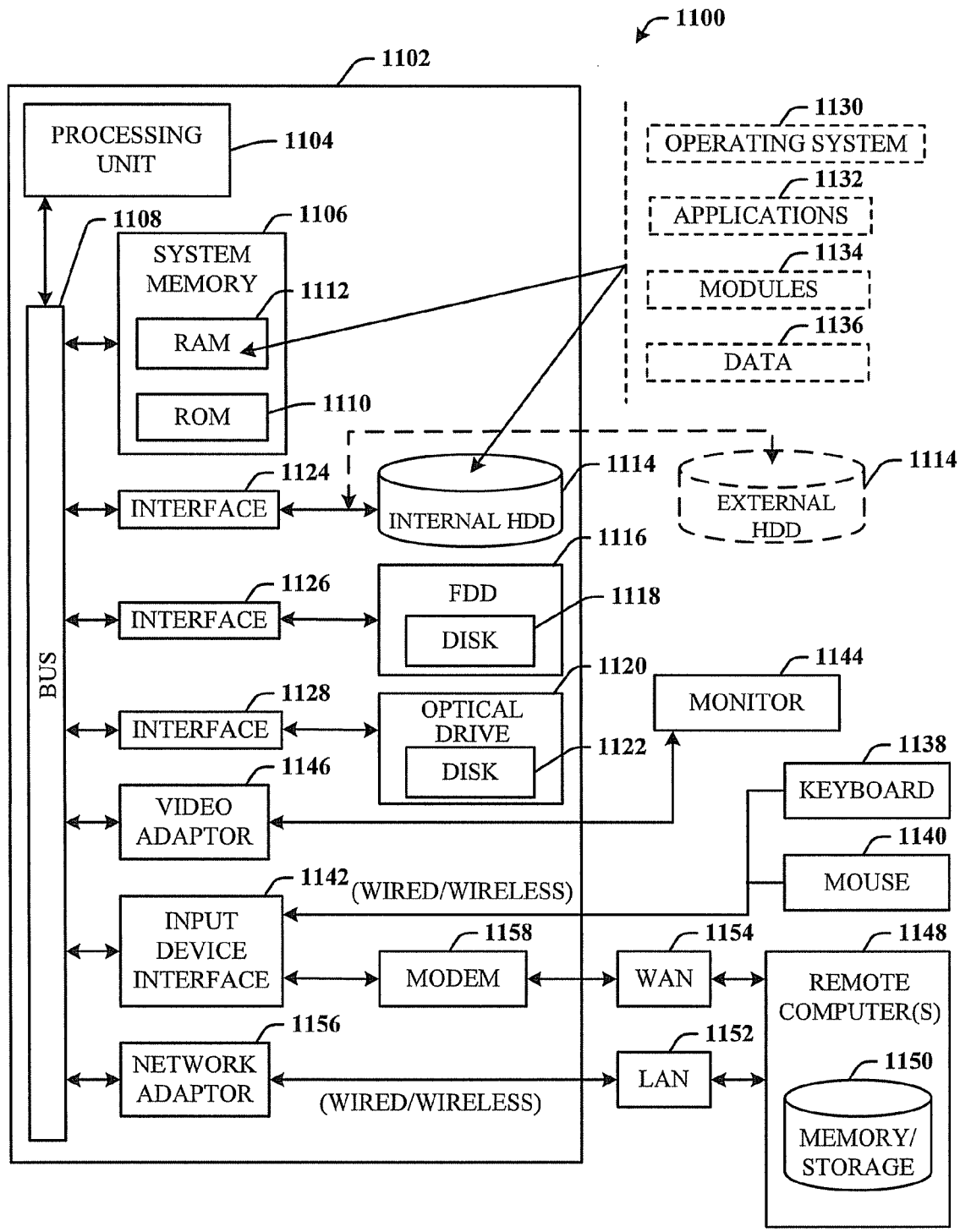
FIG. 11 is an exemplary computing environment that can be employed in connection with various aspects described herein.

Referring now to FIG. 11, there is illustrated a block diagram of a computer operable to provide storage and access such as for a UMA Network Controller and/or a Home Subscriber Server. In order to provide additional context for various aspects thereof, FIG. 11 and the following discussion are intended to provide a brief, general description of a suitable computing environment 1100 in which the various aspects described herein can be implemented. While the description above is in the general context of computer-executable instructions that may run on one or more computers, those skilled in the art will recognize that the claimed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 11, the exemplary environment 1100 for implementing various aspects includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures may also be employed as the processing unit 1104.

The system bus 1108 can be any of several types of bus structure that may further interconnect to a memory bus (with or without a memory controller), a peripheral bus, and a local bus using any of a variety of commercially available bus architectures. The system memory 1106 includes read-only memory (ROM) 1110 and random access memory (RAM) 1112. A basic input/output system (BIOS) is stored in a non-volatile memory 1110 such as ROM, EPROM, EEPROM, which BIOS contains the basic routines that help to transfer information between elements within the computer 1102, such as during start-up. The RAM 1112 can also include a high-speed RAM such as static RAM for caching data.

The computer 1102 further includes an internal hard disk drive (HDD) 1114 (e.g., EIDE, SATA), which internal hard disk drive 1114 may also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1102, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed innovation.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. It is to be appreciated that the innovation can be implemented with various commercially available operating systems or combinations of operating systems.

A user can enter commands and information into the computer 1102 through one or more wired/wireless input devices, e.g., a keyboard 1138 and a pointing device, such as a mouse 1140. Other input devices (not shown) may include a microphone, an IR remote control, a joystick, a game pad, a stylus pen, touch screen, or the like. These and other input devices are often connected to the processing unit 1104 through an input device interface 1142 that is coupled to the system bus 1108, but can be connected by other interfaces, such as a parallel port, an IEEE 1394 serial port, a game port, a USB port, an IR interface, etc.

A monitor 1144 or other type of display device is also connected to the system bus 1108 via an interface, such as a video adapter 1146. In addition to the monitor 1144, a computer typically includes other peripheral output devices (not shown), such as speakers, printers, etc.

The computer 1102 may operate in a networked environment using logical connections via wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which may connect to a global communications network, e.g., the Internet.

When used in a LAN networking environment, the computer 1102 is connected to the local network 1152 through a wired and/or wireless communication network interface or adapter 1156. The adaptor 1156 may facilitate wired or wireless communication to the LAN 1152, which may also include a wireless access point disposed thereon for communicating with the wireless adaptor 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wired or wireless device, is connected to the system bus 1108 via the serial port interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least WiFi and Bluetooth™ wireless technologies. Thus, the communication can be a predefined structure as with a conventional network or simply an ad hoc communication between at least two devices.

WiFi, or Wireless Fidelity, allows connection to the Internet from a couch at home, a bed in a hotel room, or a conference room at work, without wires. WiFi is a wireless technology similar to that used in a cell phone that enables such devices, e.g., computers, to send and receive data indoors and out; anywhere within the range of a base station. WiFi networks use radio technologies called IEEE 802.11(a, b, g, etc.) to provide secure, reliable, fast wireless connectivity. A WiFi network can be used to connect computers to each other, to the Internet, and to wired networks (which use IEEE 802.3 or Ethernet). WiFi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 12:
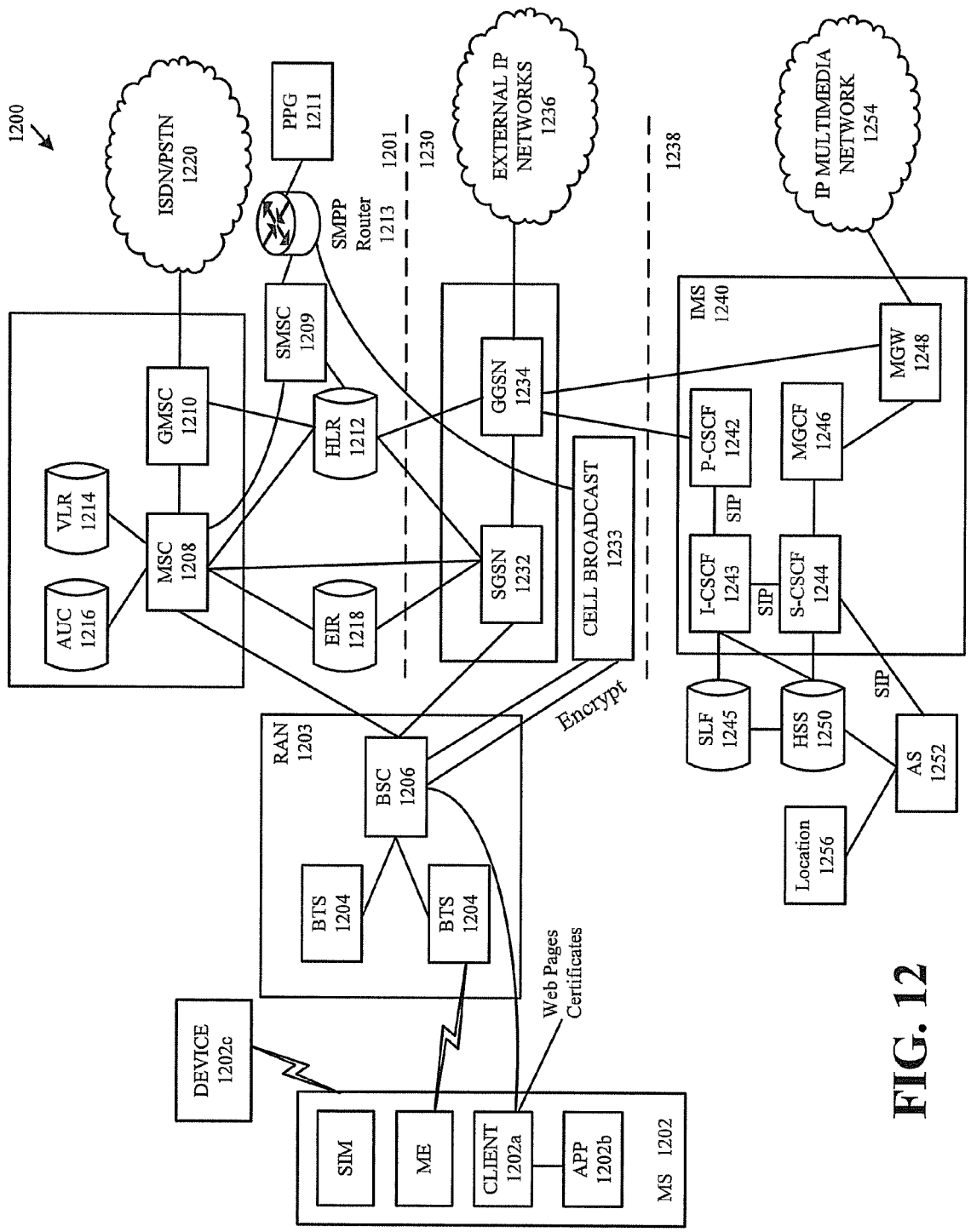
FIG. 12 is an exemplary networking environment.

Now turning to FIG. 12, such figure depicts a GSM/GPRS/IP multimedia network architecture 1200 that includes a GSM core network 1201, a GPRS network 1230 and an IP multimedia network 1238. The GSM core network 1201 includes a Mobile Station (MS) 1202, at least one Base Transceiver Station (BTS) 1204 and a Base Station Controller (BSC) 1206. The MS 1202 is physical equipment or Mobile Equipment (ME), such as a mobile phone or a laptop computer that is used by mobile subscribers, with a Subscriber identity Module (SIM). The SIM includes an International Mobile Subscriber Identity (IMSI), which is a unique identifier of a subscriber. The MS 1202 includes an embedded client 1202a that receives and processes messages received by the MS 1202. The embedded client 1202a may be implemented in JAVA and is discuss more fully below.

The embedded client 1202a communicates with an application 1202b that provides services and/or information to an end user. One example of the application may be navigation software that provides near real-time traffic information that is received via the embedded client 1202a to the end user. The navigation software may provide road conditions, suggest alternate routes, etc. based on the location of the MS 1202. Those of ordinary skill in the art understand that there are many different methods and systems of locating an MS 1202.

Alternatively, the MS 1202 and a device 1202c may be enabled to communicate via a short-range wireless communication link, such as BLUETOOTH. For example, a BLUETOOTH SIM Access Profile may be provided in an automobile (e.g., device 1202c) that communicates with the SIM in the MS 1202 to enable the automobile's communications system to pull information from the MS 1202. The BLUETOOTH communication system in the vehicle becomes an "embedded phone" that employs an antenna associated with the automobile. The result is improved reception of calls made in the vehicle. As one of ordinary skill in the art would recognize, an automobile is one example of the device 1202c. There may be an endless number of devices 1202c that use the SIM within the MS 1202 to provide services, information, data, audio, video, etc. to end users.

The BTS 1204 is physical equipment, such as a radio tower, that enables a radio interface to communicate with the MS. Each BTS may serve more than one MS. The BSC 1206 manages radio resources, including the BTS. The BSC may be connected to several BTSs. The BSC and BTS components, in combination, are generally referred to as a base station (BSS) or radio access network (RAN) 1203.

The GSM core network 1201 also includes a Mobile Switching Center (MSC) 1208, a Gateway Mobile Switching Center (GMSC) 1210, a Home Location Register (HLR) 1212, Visitor Location Register (VLR) 1214, an Authentication Center (AuC) 1218, and an Equipment Identity Register (EIR) 1216. The MSC 1208 performs a switching function for the network. The MSC also performs other functions, such as registration, authentication, location updating, handovers, and call routing. The GMSC 1210 provides a gateway between the GSM network and other networks, such as an Integrated Services Digital Network (ISDN) or Public Switched Telephone Networks (PSTNs) 1220. In other words, the GMSC 1210 provides interworking functionality with external networks.

The HLR 1212 is a database that contains administrative information regarding each subscriber registered in a corresponding GSM network. The HLR 1212 also contains the current location of each MS. The VLR 1214 is a database that contains selected administrative information from the HLR 1212. The VLR contains information necessary for call control and provision of subscribed services for each MS currently located in a geographical area controlled by the VLR. The HLR 1212 and the VLR 1214, together with the MSC

1208, provide the call routing and roaming capabilities of GSM. The AuC 1216 provides the parameters needed for authentication and encryption functions. Such parameters allow verification of a subscriber's identity. The ER 1218 stores security-sensitive information about the mobile equipment.

A Short Message Service Center (SMSC) 1209 allows one-to-one Short Message Service (SMS) messages to be sent to/from the MS 1202. A Push Proxy Gateway (PPG) 1211 is used to "push" (e.g., send without a synchronous request) content to the MS 1202. The PPG 1211 acts as a proxy between wired and wireless networks to facilitate pushing of data to the MS 1202. A Short Message Peer to Peer (SMPP) protocol router 1213 is provided to convert SMS-based SMPP messages to cell broadcast messages. SMPP is a protocol for exchanging SMS messages between SMS peer entities such as short message service centers. It is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 1202 sends a location update including its current location information to the MSC/VLR, via the BTS 1204 and the BSC 1206. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 1230 is logically implemented on the GSM core network architecture by introducing two packet-switching network nodes, a serving GPRS support node (SGSN) 1232, a cell broadcast and a Gateway GPRS support node (GGSN) 1234. The SGSN 1232 is at the same hierarchical level as the MSC 1208 in the GSM network. The SGSN controls the connection between the GPRS network and the MS 1202. The SGSN also keeps track of individual MS's locations and security functions and access controls.

A Cell Broadcast Center (CBC) 1233 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 1234 provides a gateway between the GPRS network and a public packet network (PDN) or other IP networks 1236. That is, the GGSN provides interworking functionality with external networks, and sets up a logical link to the MS through the SGSN. When packet-switched data leaves the GPRS network, it is transferred to an external TCP-IP network 1236, such as an X.25 network or the Internet. In order to access GPRS services, the MS first attaches itself to the GPRS network by performing an attach procedure. The MS then activates a packet data protocol (PDP) context, thus activating a packet communication session between the MS. the SGSN, are the GGSN.

In a GSM/GPRS network, GPRS services and GSM services can be used in parallel. The MS can operate in one three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time. A class B MS can attach to the network for both GPRS services and GSM services simultaneously. However, a class B MS does not support simultaneous operation of the GPRS services and GSM services. That is, a class B MS can only use one of the two services at a given time. A class C MS can attach for only one of the GPRS services and GSM services at a time. Simultaneous attachment and operation of GPRS services and GSM services is not possible with a class C MS.

A GPRS network 1230 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not received pages from a circuit switched domain when engaged in a data call, since the MS is receiving data and is not listening to a paging channel In a NOM3 network, a MS can monitor pages for a circuit switched network while received data and vise versa.

The IP multimedia network 1238 was introduced with 3GPP Release 5, and includes an IP multimedia subsystem (IMS) 1240 to provide rich multimedia services to end users. A representative set of the network entities within the IMS 1240 are a call/session control function (CSCF), a media gateway control function (MGCF) 1246, a media gateway (MGW) 1248, and a master subscriber database, called a home subscriber server (HSS) 1250. The HSS 1250 may be common to the GSM network 1201, the GPRS network 1230 as well as the IP multimedia network 1238.

The IP multimedia system 1240 is built around the call/session control function, of which there are three types: an interrogating CSCF (I-CSCF) 1243, a proxy CSCF (P-CSCF) 1242, and a serving CSCF (S-CSCF) 1244. The P-CSCF 1242 is the MS's first point of contact with the IMS 1240. The P-CSCF 1242 forwards session initiation protocol (SIP) messages received from the MS to an SIP server in a home network (and vice versa) of the MS. The P-CSCF 1242 may also modify an outgoing request according to a set of rules defined by the network operator (for example, address analysis and potential modification).

The I-CSCF 1243 forms an entrance to a home network and hides the inner topology of the home network from other networks and provides flexibility for selecting an S-CSCF. The I-CSCF 1243 may contact a subscriber location function (SLF) 1245 to determine which HSS 1250 to use for the particular subscriber, if multiple HSS's 1250 are present. The S-CSCF 1244 performs the session control services for the MS 1202. This includes routing originating sessions to external networks and routing terminating sessions to visited networks. The S-CSCF 1244 also decides whether an application server (AS) 1252 is required to receive information on an incoming SIP session request to ensure appropriate service handling. This decision is based on information received from the HSS 1250 (or other sources, such as an application server 1252). The AS 1252 also communicates to a location server 1256 (e.g., a Gateway Mobile Location Center (GMLC)) that provides a position (e.g., latitude/longitude coordinates) of the MS 1202.

The HSS 1250 contains a subscriber profile and keeps track of which core network node is currently handling the subscriber. It also supports subscriber authentication and authorization functions (AAA). In networks with more than one HSS 1250, a subscriber location function provides information on the HSS 1250 that contains the profile of a given subscriber.

The MGCF 1246 provides interworking functionality between SIP session control signaling from the IMS 1240 and ISUP/BICC call control signaling from the external GSTN networks (not shown). It also controls the media gateway (MGW) 1248 that provides user-plane interworking functionality (e.g., converting between AMR- and PCM-coded voice). The MGW 1248 also communicates with other IP multimedia networks 1254.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of such matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:
    identifying, by a system comprising a processor, a communication associated with a telecommunications service and directed to a wireless device;
    in response to determining that a wireless signal of the wireless device has been detected by a detection device corresponding to an internet protocol television device, determining whether the wireless device corresponds to subscription data representing a subscription of the telecommunications service;
    in response to determining that the wireless device corresponds to the subscription data, extracting, by the system, information from a set-up message comprising set-up information that facilitates a set-up process associated with the subscription; and
    sending, by the system, a session initiation protocol message comprising the information directed to the internet protocol television device to facilitate display of the information by the internet protocol television device.

2. The method of claim 1, wherein the information comprises text comprising an identifier representing a subscriber of a wireless communications service.

3. The method of claim 1, wherein the information comprises text comprising an identifier representing a source of the communication.

4. The method of claim 1, wherein the sending comprises routing text to a proxy based device that is communicatively coupled to the wireless device.

5. The method of claim 1, wherein the communication comprises a telephone call.

6. The method of claim 1, wherein the communication comprises a short message service message.

7. The method of claim 1, wherein the communication comprises an electronic mail.

8. A system, comprising:
    a memory that stores executable instructions; and
    a processor, coupled to the memory, that facilitates execution of the executable instructions to perform operations, comprising:
        identifying a communication that is associated with a telecommunications service and directed to a wireless device;
        in response to determining that a sensing device associated with an internet protocol television based device has detected a wireless signal of the wireless device, determining whether the wireless device has been associated with subscription information representing a subscription to the telecommunications service;
        in response to determining that the wireless device has been associated with the subscription information, extracting information from a setup message corresponding to the subscription, wherein the setup message comprises setup information that facilitates a setup process associated with the subscription; and
        sending a session initiation protocol message comprising the information to the internet protocol television based device to facilitate display of the information by the internet protocol television based device.

9. The system of claim 8, wherein the information comprises text comprising an identifier representing a name of a user associated with a device that initiated the communication.

10. The system of claim 8, wherein the information comprises text comprising a telephone number that is associated with the communication.

11. The system of claim 8, wherein the communication comprises a short message service message.

12. The system of claim 8, wherein the extracting comprises extracting the information using a generic access network controller device.

13. The system of claim 8, wherein the extracting comprises extracting the information using an internet protocol based device.

14. The system of claim 8, wherein the operations further comprise:
    receiving the communication from a computing device that is communicatively coupled to a set-top box device.

15. The system of claim 8, wherein the operations further comprise:
    sending the information directed to a proxy based device.

16. A computer-readable storage device comprising computer executable instructions that, in response to execution, cause a computing system comprising a processor to perform operations, comprising:
    identifying a communication of a telecommunications service that is directed to a wireless device;
    in response to determining that a wireless signal of the wireless device has been detected by a sensing device associated with an internet protocol television based device, determining whether the wireless device is associated with subscription information representing a subscription of the telecommunications service;
    in response to the wireless device being determined to be associated with the subscription information, extracting information from a setup message comprising setup information that facilitates a setup process that is associated with the subscription; and
    sending a session initiation protocol message comprising the information directed to the internet protocol television based device for display of the information by the internet protocol television based device.

17. The computer-readable storage device of claim 16, wherein the information comprises text comprising an identifier representing a name of a user associated with an initiation of the communication.

18. The computer-readable storage device of claim 16, wherein the extracting the information comprises extracting text from a short message service message.

19. The computer-readable storage device of claim 16, wherein the identifying the information comprises extracting text from an electronic mail.

20. The computer-readable storage device of claim 16, wherein the communication comprises a telephone call.

* * * * *